United States Patent
Deguchi

(10) Patent No.: US 6,972,698 B2
(45) Date of Patent: Dec. 6, 2005

(54) GPS E-MARKER

(75) Inventor: Yuichiro Deguchi, San Mateo, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 250 days.

(21) Appl. No.: 10/184,573

(22) Filed: Jun. 28, 2002

(65) Prior Publication Data

US 2004/0000995 A1   Jan. 1, 2004

(51) Int. Cl.$^7$ ............................................. G08G 1/123
(52) U.S. Cl. ............... 340/988; 340/539.1; 340/825.49
(58) Field of Search ............................... 340/988, 990, 340/995.1, 426.19, 524, 539.1, 539.13, 825.49; 455/73, 403

(56) References Cited

U.S. PATENT DOCUMENTS

| | | | |
|---|---|---|---|
| 3,836,842 A * | 9/1974 | Zimmermann et al. ..... 324/239 |
| 5,199,009 A | 3/1993 | Svast ........................ 368/240 |
| 5,297,118 A | 3/1994 | Sakumoto ................... 368/10 |
| 5,508,978 A | 4/1996 | Kalbermatter et al. ........ 368/13 |
| 5,579,472 A | 11/1996 | Keyworth, II et al. ...... 395/326 |
| 5,758,257 A | 5/1998 | Herz et al. ...................... 455/2 |
| 5,850,218 A | 12/1998 | LaJoie et al. ............... 345/327 |
| 5,889,737 A | 3/1999 | Alameh et al. ............. 368/204 |
| 5,915,288 A | 6/1999 | Gabriel ........................ 84/609 |
| 6,088,021 A | 7/2000 | Yong ........................... 345/163 |
| 6,100,884 A | 8/2000 | Tomita et al. .............. 345/327 |
| 6,104,334 A | 8/2000 | Allport ........................ 341/175 |
| 6,128,009 A | 10/2000 | Ohkura et al. .............. 345/327 |
| 6,144,864 A | 11/2000 | Lands et al. ................. 455/569 |
| 6,148,261 A * | 11/2000 | Obradovich et al. ........ 701/208 |
| 6,158,884 A | 12/2000 | Lebby et al. ............... 368/282 |
| 6,169,498 B1 | 1/2001 | King et al. .................. 340/999 |
| 6,199,125 B1 | 3/2001 | Cortesi ......................... 710/67 |
| 6,216,230 B1 | 4/2001 | Rallis et al. ................. 713/185 |
| 6,230,172 B1 | 5/2001 | Purnaveja et al. .......... 707/512 |
| 6,263,438 B1 | 7/2001 | Walker et al. .............. 713/178 |
| 6,272,545 B1 | 8/2001 | Flanagin et al. ............ 709/228 |
| 6,289,346 B1 | 9/2001 | Milewski et al. ............. 707/10 |
| 6,290,517 B1 | 9/2001 | Anderson ................... 439/131 |
| 6,304,249 B1 | 10/2001 | Derocher et al. ........... 345/163 |
| 6,323,783 B1 | 11/2001 | Lizzi et al. ............. 340/825.44 |
| 6,330,490 B1 | 12/2001 | Kim et al. ................... 700/234 |
| 6,353,398 B1 * | 3/2002 | Amin et al. ............ 340/995.12 |
| 6,356,971 B1 | 3/2002 | Katz et al. .................. 710/301 |
| 6,360,209 B1 | 3/2002 | Loeb et al. ................... 705/34 |
| 6,392,635 B1 | 5/2002 | Snyder ........................ 345/163 |
| 6,425,081 B1 | 7/2002 | Iwamura ..................... 713/176 |
| 6,427,175 B1 | 7/2002 | Khan et al. ................. 709/245 |
| 6,493,702 B1 | 12/2002 | Adar et al. ..................... 707/3 |
| 6,507,727 B1 | 1/2003 | Henrick ..................... 455/3.06 |
| 6,515,595 B1 * | 2/2003 | Obradovich et al. ........ 340/905 |
| 6,556,513 B2 | 4/2003 | Wimberly ..................... 368/82 |
| 6,559,773 B1 | 5/2003 | Berry ....................... 340/815.4 |
| 6,571,577 B2 | 6/2003 | Radley-Smith .................. 63/3 |
| 6,578,047 B1 | 6/2003 | Deguchi ..................... 707/104 |
| 6,637,028 B1 | 10/2003 | Voyticky et al. ............. 725/42 |
| 6,650,534 B2 | 11/2003 | Tree ........................... 361/686 |
| 6,650,877 B1 | 11/2003 | Tarbouriech et al. ..... 455/186.1 |
| 6,674,993 B1 | 1/2004 | Tarbouriech .............. 455/2.01 |
| 6,680,714 B2 | 1/2004 | Wilmore ..................... 345/1.1 |
| 6,763,371 B1 | 7/2004 | Jandel ........................ 709/204 |

(Continued)

Primary Examiner—Phung T. Nguyen
(74) Attorney, Agent, or Firm—John P. O'Banion

(57) ABSTRACT

Method and system for a satellite network data communication enabled electronic bookmarking device for bookmarking positional information of a desired location or locations in addition to bookmarking broadcast music clips over registered radio or television stations is provided.

9 Claims, 13 Drawing Sheets

U.S. PATENT DOCUMENTS

| | | |
|---|---|---|
| 2001/0019618 A1 | 9/2001 | Rhoads ..................... 382/100 |
| 2001/0020239 A1 | 9/2001 | Ukigawa ................. 707/104.1 |
| 2001/0034219 A1 | 10/2001 | Hewitt et al. ............ 455/186.1 |
| 2001/0040977 A1 | 11/2001 | Nakano ..................... 382/100 |
| 2001/0051996 A1 | 12/2001 | Cooper et al. .............. 709/217 |
| 2002/0007354 A1 | 1/2002 | Deguchi ..................... 705/418 |
| 2002/0023272 A1 | 2/2002 | Pocock ..................... 725/109 |
| 2002/0032019 A1 | 3/2002 | Marks et al. ............... 455/414 |
| 2002/0032698 A1 | 3/2002 | Cox ........................ 707/501.1 |
| 2002/0056084 A1 | 5/2002 | Harris et al. .................... 725/1 |
| 2002/0068991 A1 | 6/2002 | Fitsimmons ................ 700/214 |
| 2002/0120850 A1 | 8/2002 | Walker et al. ............. 713/178 |
| 2002/0162009 A1 | 10/2002 | Shmueli et al. ............ 713/200 |
| 2002/0164973 A1 | 11/2002 | Janik et al. ................ 455/403 |
| 2002/0174372 A1 | 11/2002 | Venkataraman ............ 713/400 |
| 2002/0174431 A1 | 11/2002 | Bowman ..................... 725/47 |
| 2002/0186886 A1 | 12/2002 | Rhoads |
| 2003/0005433 A1 | 1/2003 | Janik et al. .................... 725/18 |
| 2003/0012403 A1 | 1/2003 | Rhoads et al. .............. 382/100 |
| 2003/0023421 A1 | 1/2003 | Finn et al. |
| 2003/0027634 A1 | 2/2003 | Matthews, III ............. 436/39 |
| 2003/0097351 A1 | 5/2003 | Rothschild et al. |
| 2003/0103645 A1 | 6/2003 | Leza ......................... 382/100 |
| 2003/0174167 A1 | 9/2003 | Poo et al. ................... 345/752 |
| 2003/0217206 A1 | 11/2003 | Poo |
| 2004/0171377 A1 | 9/2004 | Engstrom .................. 455/419 |
| 2004/0203729 A1 | 10/2004 | Makipaa et al. ......... 455/426.1 |

\* cited by examiner

| Device ID: K01-U03-N45-I67 | | | |
|---|---|---|---|
| Bookmark | Date | Time (GMT) | Location ID |
| Bookmark #1 | 1/21/01 | 13:46 | ID123100 |
| Bookmark #2 | 1/30/01 | 18:53 | ID201458 |
| Bookmark #3 | 2/1/01 | 9:13 | ID201458 |
| Bookmark #4 | 2/1/01 | 11:32 | ID279465 |
| Bookmark #5 | 2/1/01 | 16:12 | ID012458 |
| Bookmark #6 | 2/2/01 | 1:23 | ID879454 |

FIGURE 3

| Location ID: ID201458 | | |
|---|---|---|
| Date | Time (GMT) | Marker ID |
| 1/19/01 | 13:46 | A11-K21-K43-F23 |
| 1/30/01 | 18:53 | K01-U23-N45-I67 |
| 2/1/01 | 9:13 | ID Blocked |
| 2/2/01 | 11:32 | B32-F32-V67-J88 |
| 2/2/01 | 12:32 | B33-D23-D45-K12 |
| 2/4/01 | 1:23 | B32-F32-V67-J88 |

FIGURE 5

| User Name | Marker ID | User Account Name | User Billing Information | User Contact Information |
|---|---|---|---|---|
| John First | A11-K21-K43-F23 | FirstJ | VS : 5485-5647-8821-0012 | firstj@yahoo.com |
| Matt Sawyer | K01-U23-N45-I67 | Msawyer | DIS: 456-85468-45441 | mattsaw@netzero.com |
| Steve Sansnishi | B32-F32-V67-J88 | Tznet | MS: 3215-5649-1300-8745 | tz@greatnet.net |
| Helen Owen | B33-D23-D45-K12 | Howen | AM : 1245-856978-01147 | hoh@aol.com |
| Jack Green | B32-F32-V67-J88 | JGG | VS : 1245-5412-8547-5565 | greenj@home.net |

FIGURE 7

| Marker ID | User Account Name | User Account Status | User Payment Status |
|---|---|---|---|
| A11-K21-K43-F23 | FirstJ | Active | Past Due |
| K01-U23-N45-I67 | Msawyer | Active | Current |
| B32-F32-V67-J88 | Tznet | Inactive | Current |
| B33-D23-D45-K12 | Howen | Active | Delinquent |
| B32-F32-V67-J88 | JGG | Closed | Closed |

FIGURE 8

| Marker ID | Bookmark # | Longitude | Latitude | Date | Time (GMT) |
|---|---|---|---|---|---|
| A11-K21-K43-F23 | Bookmark 1 | 27 | 34 | 1/19/01 | 13:46 |
| K01-U23-N45-I67 | Bookmark 2 | 27 | 34 | 1/30/01 | 18:53 |
| B32-F32-V67-J88 | Bookmark 1 | 43 | 23 | 2/1/01 | 14:28 |
| B33-D23-D45-K12 | Bookmark 2 | 46 | 61 | 2/2/01 | 11:13 |
| B32-F32-V67-J88 | Bookmark 4 | 12 | 79 | 2/3/01 | 18:23 |

FIGURE 9

| Location ID | Longitude | Latitude | Name | Address | Contact Information |
|---|---|---|---|---|---|
| ID123100 | 43 | 23 | General Store | 23 High Street, Boston, MA 02146 | John Shoes, Manager (617) 124-8859 |
| ID201458 | 27 | 34 | Garment for U | 142 Main Road, San Francisco, CA 94110 | Fab Silk, Owner (415) 245-9947 |
| ID804578 | 78 | 61 | Gadgets, Inc. | One Willow St., Vancouver, B.C. V6B 2M9 | Elan Hayes, Manager (604) 124-7457 |
| ID708845 | 12 | 91 | Creative Drinks | 5 Highway 50, Stateline, NV 89449 | Snow Trails, Owner (775) 457-1211 |
| ID065987 | 46 | 61 | Secure Bank | 120 Tree Rd, Oakland, CA 94607 | Din Ero, Manager (510) 551-4578 |
| ID708457 | 12 | 79 | Ads, Inc. | 450 Wacker St., Chicago, IL 60651 | Audrey Sees, Manager (312) 322-3124 |

FIGURE 10

GPS E-MARKER

BACKGROUND OF THE INVENTION

1. Field of the Invention

The present invention relates to portable electronic devices. More particularly, the present invention relates to method and apparatus for bookmarking information related to a particular location or a plurality of locations and downloading information related to e-marked locations and authenticating the marked locations.

2. Description of the Related Art

With rapid rise in the many different types of portable electronic devices available such as personal digital assistants (PDAs) and WAP (Wireless Application Protocol) enabled mobile telephones, there has been a steady increase in added functionalities integrated into these devices to perform more operations.

Sony Corporation and its U.S. subsidiary, Sony Electronics, Inc., introduced a so called e-marker which is capable of "bookmarking" a music clip while being played on a radio and is capable of recalling the information related to the bookmarked music clip such as the name of the song, the artist, the album containing the song and so on. Using the e-marker, a user can conveniently access the music clip information that the user listened to on the radio at a later time without the need to memorize the information or wait hopefully for the disc jockey on the radio to provide that information. In this manner, if the user wants to, for example, purchase the music album which the user has marked using the e-marker, the user can easily identify the necessary information related to the marked music clip from the e-marks provided by the e-marker.

Further information relating to the operation of the e-marker can be found in pending application Ser. No. 09/126,007 filed on Jul. 29, 1998 and application Ser. No. 09/401,103 filed on Sep. 22, 1999, both assigned to Sony Corporation, joint-assignee of the present application with Sony Electronics, Inc., a subsidiary of Sony Corporation, the disclosures of each of which are incorporated herein in their entirety by reference for all purposes.

The e-markers are capable of bookmarking transmission from a registered radio and/or television broadcasts such that the user is capable of identifying (or "e-marking") a music broadcast heard over the radio or a television broadcast by first operating the electronic bookmarking device, and then, logging onto the user's e-marker account web site through a computer terminal and the like connected to the internet.

Given that the e-marker is designed for portability and ease of use, users may benefit further from additional capabilities using the e-marker device. For example, just as easily as one forgets the name or the artist for a song heard on the radio, it is desirable that a user be able to track information related to the places that the user has visited during a particular time period. For example, an e-marker user who visits many stores or other locations in a given day, rather than collecting a business card or a brochure from each visited store or location, or writing down the particular information related to each visited stores or offices, such as the contact information, the business telephone number, and the facsimile number.

Additionally, if the user conducts any transaction at any store or location visited on a given day, it would be useful for the user to keep track of that information without cumbersome and time consuming approach such as keeping receipts of each transaction or maintaining a written or otherwise recorded list of each transaction.

SUMMARY OF THE INVENTION

In view of the foregoing, an electronic data marker device of one aspect includes a controller, a memory coupled to the controller configured to store data, and an input/output interface unit coupled to the controller, the input/output interface configured to transmit a signal and in response thereto, receive a position data.

A method, of another aspect includes operating an input unit of a data marking device, receiving a location identification, receiving a position data, and generating a position mark corresponding to the input unit operation.

A method of a further aspect includes receiving one or more of a data marking device identification code, a position mark, a location identification and a position data, retrieving a location data corresponding to the identification code, and transmitting the retrieved location data.

A satellite network enabled position marking system of a further aspect includes a satellite network, a location including configured to communicate with the satellite network, a data marking device configured to communicate with the satellite network to receive a position data, the data marking device further configured to receive a location identification code from the location, and a server terminal configured to communicate with the satellite network and the data marking device, the server terminal further configured to receive the position data and the identification code from the data marking device and accordingly, to transmit location information to the data marking device.

In this manner, in accordance with the various embodiments of the present invention, there are provided method and system for downloading information related to e-marked locations and authenticating the visited locations by enabling e-marker devices with satellite network capability using systems such as the Global Positioning System (GPS) such that a user can bookmark a location such as a store or any other location visited and later on is able to access information related to the visited store or location through the user's e-marker account connected through a computer terminal and the like over the internet to the e-marker web site.

These and other features and advantages of the present invention will be understood upon consideration of the following detailed description of the invention and the accompanying drawings.

BRIEF DESCRIPTION OF THE DRAWINGS

FIG. 3 illustrates a storage unit of the electronic bookmarking device of FIG. 2;

FIG. 5 is a tabular illustration of a memory unit of the interface communicating driver shown in FIG. 3 of the bookmarking enabled location;

FIG. 7 illustrates a user database of the database storage unit shown in FIG. 6;

FIG. 8 illustrates a user account database of the database storage unit shown in FIG. 6;

FIG. 9 illustrates a position database of the database storage unit shown in FIG. 6;

FIG. 10 illustrates a location database of the database storage unit shown in FIG. 6;

DETAILED DESCRIPTION

Figure 1:
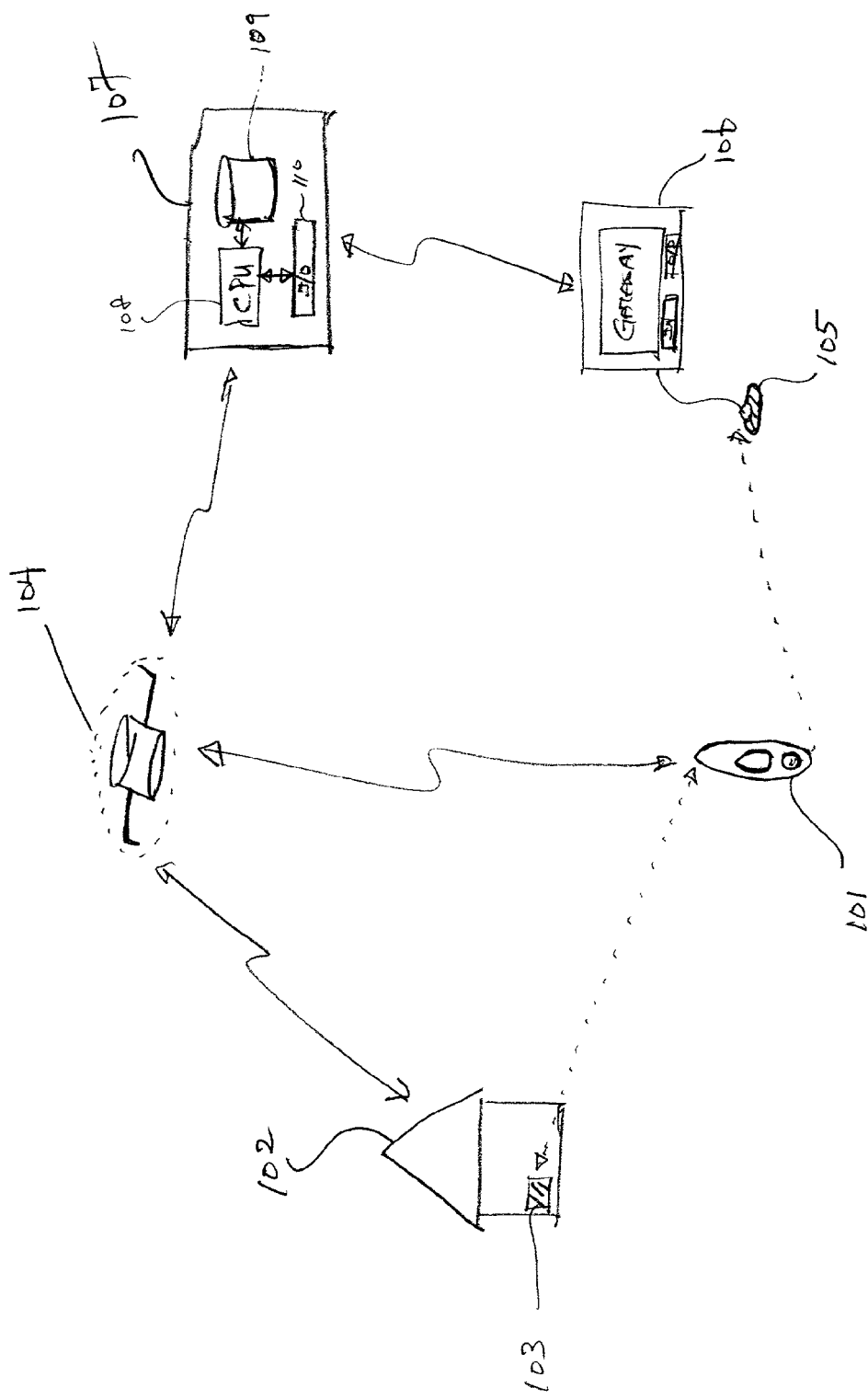
FIG. 1 illustrates an overall communication system for marking positional information.

FIG. 1 illustrates a communication system for marking positional information. Referring to FIG. 1, communication system 100 includes electronic bookmarking device 101, and bookmarking enabled location 102 such as a store, an office or the like which includes interfacing communication device 103 (for example, a computer terminal with a device driver) which is configured to communicate with bookmarking device 101. As shown, bookmarking device 101 is satellite communication enabled such that it incorporates the functional capability of transmitting and receiving data including positional information such as longitudinal and latitudinal data to satellite network 104.

Further shown in FIG. 1 is interface device 106 such as a personal computer terminal and the like connected to the internet via communication protocols such as TCP/IP and so on. Interface device 106 is configured to communicate with server 107 via the internet for transmitting and receiving information. Moreover, interface device 106 is configured to communicate with bookmarking device 101 through cradle-type connection 105. In this manner, when bookmarking device 101 is coupled (or "hot-synched") to connection 105, interface device 106 may be configured to transmit and receive data between bookmarking device 101 and server 107 via the internet connection.

It should be noted that interface device 106 may be connected to the internet using any available connection such as, but not limited to, a modem-type dial up to a service provider (not shown), a T1, or LAN-type connection through a network, ISDN, cable modem or DSL type connection presently available. Alternatively, the interface device may be configured to connect to the server via an internet connection using wireless-type connection or any other types of connection using interface protocols such as USB, IEEE-1394, RD232C, or IrDA interface protocol.

Moreover, while a personal computer is provided as an example of interface device 106, within the scope of the present invention, interface device 106 can include a wireless communication enabled personal digital assistant (PDA) such as Palm VII or OmniSky service coupled to a Palm-type device, a PCS-type telephone, i-mode telephone, and so on, so long as interface device 106 is configured to connect to the internet. To this end, while connection 105 is shown in FIG. 1 to connect bookmarking device 101 to interface device 106, in accordance with the present invention, bookmarking device 101 can be configured for direct or wireless connection to interface device 106, including wireless communication via IrDA ports or Bluetooth enabled ports.

Server 107 in accordance with one embodiment of the present invention includes storage unit 109, controller 108 such as a central processing unit (CPU), and input/output (I/O) Interface 110. As will be discussed in further detail below, I/O interface 110 may be configured to communicate with interface device 106 via an internet connection, and under the control of controller 108, server 107 may be configured to transmit and receive data from interface device 106, to retrieve stored data in storage unit 109 for transmission to interface device 106, as well as to update data stored in storage unit 109.

Satellite network 104 in one embodiment may be configured to enable wireless satellite communication between bookmarking device 101, bookmarking enabled location 102, and server 107 such that, as will be discussed in further detail below, the positional data of bookmarking device 101 may be detected and transmitted to bookmarking device 101 for transmission to server terminal 107, and also, location information corresponding to the bookmarking enabled location 102 may be transmitted to server terminal 107 via satellite network 104. In particular, satellite network 104 may include one or more combination of a geosynchronous orbit, an inclined orbit, a polar orbit, or a geostationary orbit established using different constellations of satellites providing global communication coverage. Examples of such satellite network include GPS which operates with approximately 18–24 satellites with 55°–63° inclination, and Globalstar system which operates with approximately 48 satellites at 47° inclination. In this manner, each satellite network is configured to provide global communication network.

Figure 2:
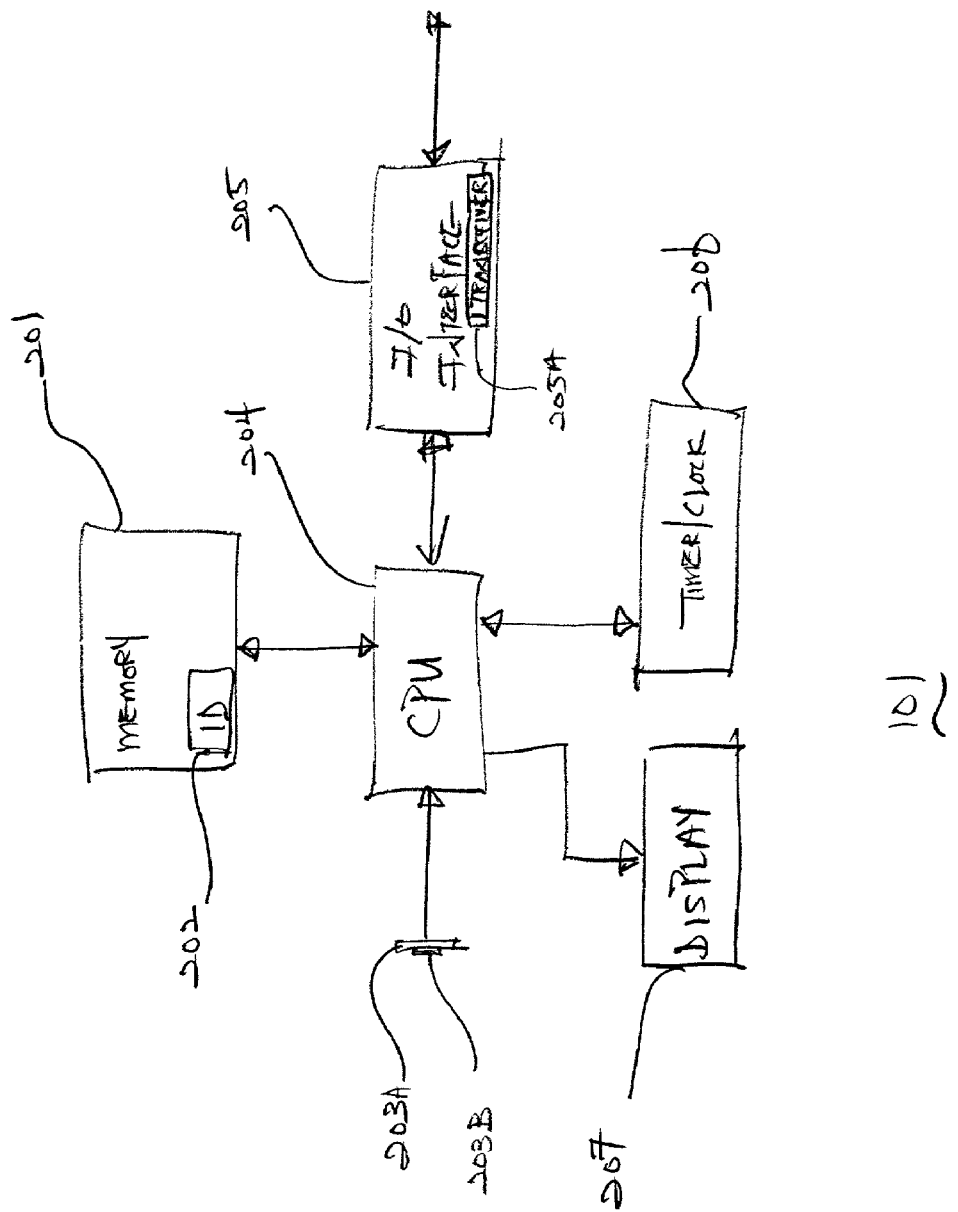
FIG. 2 illustrates a block diagram of the electronic bookmarking device of Figure.

FIG. 2 illustrates a block diagram of the electronic bookmarking device shown in FIG. 1. Referring to FIG. 2, bookmarking device 101 includes memory 201 such as a Random Access Memory (RAM) and a Read-Only Memory (ROM), and stored thereon is a unique bookmarking device identification code 202 which can include a predetermined combination of letters or numbers, or a combination of both. In one embodiment, identification code 202 can include a thirteen digit number which is unique to each bookmarking device and is pre-stored in the ROM portion of memory 201.

Further shown in FIG. 2 is controller (CPU) 204 which is configured to control the various components of bookmarking device 101 as shown such as display unit 207, input units 203A, 203B such as bookmarking buttons for bookmarking broadcast music clips over a registered radio or television station, or for bookmarking locations, input/output (I/O) interface 205, clock/timer 206, and memory 201. As can be seen from FIG. 2, upon receiving an input signal from a user of bookmarking device 101 via input units 203A, 203B, controller 204 may be configured to access the various components of device 101 depending upon the input command received from the user, to perform one or a plurality of processings, executing the input command of the user.

Moreover, I/O interface 205 of bookmarking device 101 shown in FIG. 2 may be configured to, under the control of controller 204, interface with satellite network 104 for communication with server 107 or alternatively, via connection 105 connect to interface device 106 for communication with server terminal 107. In particular, I/O interface 205 may include transceiver 205A which is configured to transmit a signal to satellite network 104, which, in turn, sends back positional information to transceiver 205A based on the signal transmitted from transceiver of I.O interface 205 of bookmarking device 101. Additionally, I/O interface 205 may further be configured to receive positional data such as longitudinal and latitudinal information from satellite network 104 and store it in memory 201. Display unit 207 in accordance with one embodiment of the present invention may include a liquid crystal display (LCD), a plasma-type display, and the like, configured to display text or image data, or a combined text and image data. Furthermore, as discussed above, the input unit 203A, 203B may include spring-loaded type input buttons for operation by the user's finger. Alternatively, input unit 203A, 203B may include a touchpad-type screen integrated with display unit 207 for simultaneously inputting and displaying information, where the user can tap the pressure-sensitive screen using a stylus or the like to enter input commands. Timer/clock 206 of bookmarking device 101 in accordance with one aspect of the present invention may be configured to provide actual time information as well as generate an elapsed time information depending upon the input command from the user under the control of controller 204.

FIG. 3 is a tabular representation of the data in the storage unit 201 of the electronic bookmarking device 101 of FIG. 2. Referring to FIG. 3, identification code field 310 includes unique identification code 202 for bookmarking device 101. In one embodiment, identification code 202 as shown in FIG. 3 may be a combination of letters and numbers, such as in this case "K01-U23-N45-I67". As discussed above, however, the identification code is not limited to a combination of letters and numbers, and may include a predetermined length of numbers only or letters only, or any other manner by which bookmarking device 101 can be uniquely identified.

Further shown in FIG. 3 is bookmark number field 320 which stores the number of bookmark entries input by the user. Date field 330 is configured to store the date information corresponding to the respective entered bookmarks, while time field 340 is configured to store time information corresponding to the respective entered bookmarks. Additionally, location ID field 350 is configured to store the unique location identification code corresponding to the respective entered bookmarks. In one aspect, location IDs stored in location ID field 350 of bookmarking device 101 may correspond to the unique identification data string received from each bookmarking enabled location 102.

For example, it can be seen from FIG. 3 that the user operating bookmarking device 101 with device ID "K01-U23-N45-I67" bookmarked a first location bookmark on Jan. 21, 2001 at 1:36 pm for a store, an office and the like with a location ID "ID123100". Furthermore, FIG. 3 shows that the same user has bookmarked another location on the same day at 4:14 pm whose location ID is ID201471. In the manner described above, in accordance with one embodiment of the present invention, under the control of controller 204, based on input information received via input unit 203A, 203B, storage unit 201 of bookmarking device 101 may be configured to store the information corresponding to the "bookmarks" of the locations that the user has visited and bookmarked using electronic bookmarking device 101. Furthermore, as will be explained in further detail below, the unique location ID in accordance with one embodiment of the present invention may be provided to bookmarking device 101 by interfacing communication device 103 of the bookmarking enabled location 102.

Figure 4:
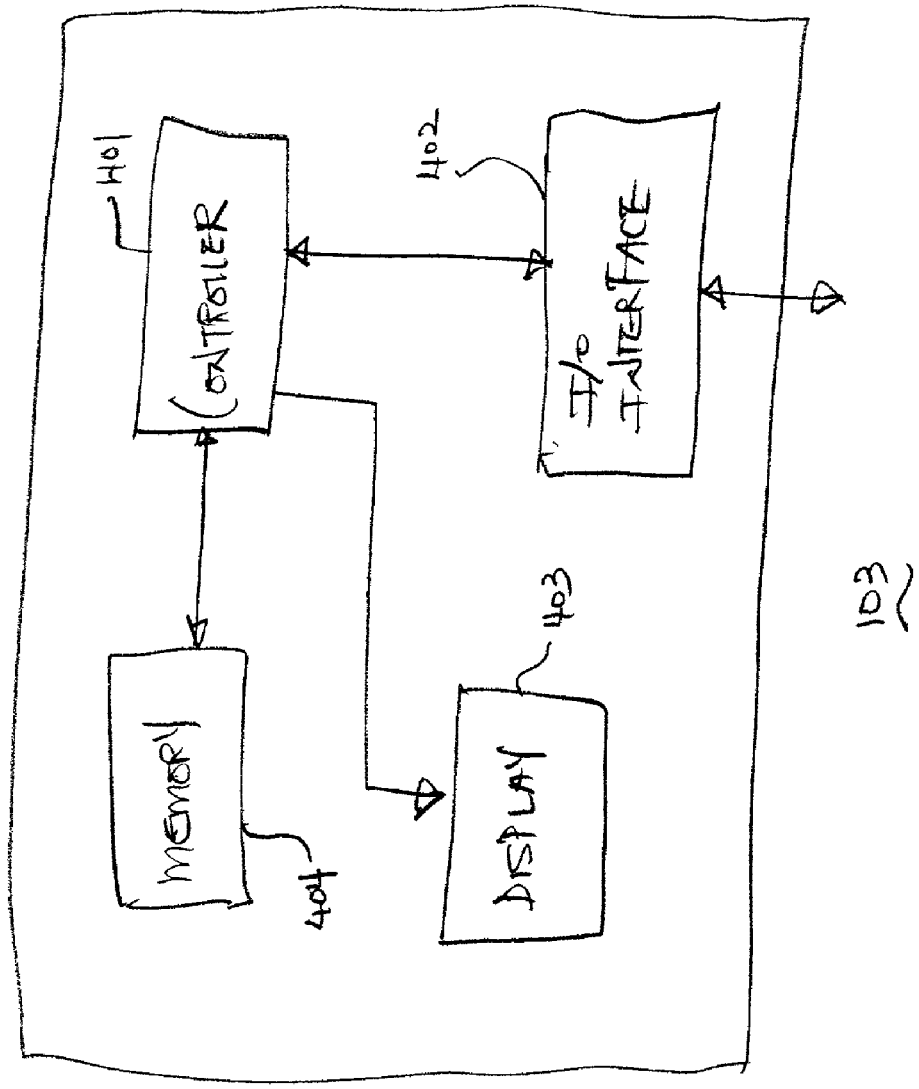
FIG. 4 illustrates a block diagram of an interfacing communication device at the bookmarking enabled location shown in FIG. 1.

FIG. 4 illustrates a block diagram of the interfacing communication device at the bookmarking enabled location shown in FIG. 1. Referring to FIG. 4, interfacing communication device 103 of bookmarking enabled location 102 in one embodiment includes controller 401, input/output (I/O) interface 402, display unit 403, and memory unit 404. Controller 401 is coupled to memory unit 404 to store and retrieve data from the memory unit 404, and further, optionally display the data retrieved or stored in memory unit 404 on display unit 403.

Controller 401 may include, but not limited to, a commercially available processor such as Pentium or x86-type processor available from Intel Corporation, AMD processors from AMD Corporation, and PowerPC processors from Motorola, Inc. Further, memory unit 404 may include a commercially available data storage unit such as an external or internal hard drive, mass storage device such as CD-RW or a Zip drive, while display unit 403 may include a liquid crystal display (LCD) unit, a plasma display unit or a cathode ray tube. I/O interface 402 is coupled to controller 401 and is configured to communicate with bookmarking device 101 and satellite network 104 for data transmission and reception.

As will be explained in further detail below, in one aspect of the present invention, interface communicating device 103 of bookmarking enabled location 102 is configured to upload its location information via satellite network 104 to server 107. The location information of bookmarking enabled location 102 may include information related to the corresponding location such as location name, location address, location telephone number, location facsimile number, location contact person information, and the type of business of the location.

In one embodiment of the present invention, responsive to a prompt signal from bookmarking enabled location 102, server terminal 107 may be configured to assign a unique location identification such as location ID 350 shown in FIG. 3, and transmit the same to location 102. Bookmarking enabled location 102 then receives location ID 350 uniquely assigned to its location, and stores the received location ID 350 in memory unit 404. Additionally, in one aspect of the present invention, server 107 may be configured to store the location information received from bookmarking enabled location 102 in server storage unit 109 corresponding to location ID 350.

Server 107 and bookmarking enabled location 102 may be configured in one embodiment to communicate via an internet connection using similar protocol as the connection of interface device 106 to server 107 discussed above such as TCP/IP protocol and so on. Moreover, in an alternate embodiment, I/O interface 402 of interface communication device 103 at bookmarking enabled location 102 may be configured to communicate with I/O interface 205 of electronic bookmarking device 101 to transmit information such as the location ID to bookmarking device 101.

As will be discussed in further detail below, in one aspect of the present invention, bookmarking device 101 may be configured to store the location ID received from interface communicating device 103 of bookmarking enabled location 102, and also, to store its positional information received from satellite network 104 in memory unit 201. In this manner, in one embodiment, when a user of electronic bookmarking device 101 visits bookmarking enabled location 102 and wishes to "bookmark" the location visited, the user may operate bookmarking device 101 to mark the location, and as will be discussed in further detail below, the user may retrieve information related to the bookmarked location from server terminal 107.

FIG. 5 is a tabular illustration of memory unit 404 of interface communicating driver 103 shown in FIG. 3 of bookmarking enabled location 102. Referring to FIG. 5, in location ID field 510, unique location ID assigned by server 107 and transmitted to bookmarking enabled location 102 is stored. In one embodiment, with each "bookmarks" from various users of electronic bookmarking device 101, memory unit 404 may be configured to store information corresponding to the bookmarking devices as well as the time and date information corresponding to the received bookmarks.

In particular, as shown in FIG. 5, bookmark date field 520 and bookmark time field 530 may be configured to store the date and time, respectively, of the bookmark from bookmarking device 101. Moreover, marker ID field 540 as shown in FIG. 5 may be configured to store the unique identification code of the bookmarking device 101 which, in one embodiment, may be transmitted from electronic bookmarking device 101 to interface communicating device 103 of bookmarking enabled location 102 when the user operates electronic bookmarking device 101 to "bookmark" the particular location. For example, as can be seen from FIG. 5, the user of bookmarking device 101 having identification code "K01-U23-N45-I67" bookmarked location 102 having location ID "ID201471" on Jan. 30, 2001 at 6:53 pm. Such information may be advantageous to the operator of bookmarking enabled location 102.

Alternatively, in one aspect of the present invention, electronic bookmarking device 101 may be configured to block the transmission of its unique identification code such that even when the user of electronic bookmarking device 101 bookmarks a bookmarking enabled location 102, the unique identification code for bookmarking device 101 is not transmitted to interface communicating device 103 of location 102. In this manner, if the user wishes to remain unidentifiable, and thus maintain the user's identity and privacy, it is possible to disable the transmission of the user's unique identification code of electronic bookmarking device 101. For example, as shown in FIG. 5, the entry in marker ID field 540 corresponding to the Feb. 1, 2001 date and 9:13 am in the date and time field entry 520, 530, respectively, indicated "ID Blocked". Thus, while bookmarking enabled location 102 may have a record of a user bookmarking its location on Feb. 1, 2001 at 9:13 am, it does not have the particular information relating to the actual user or the unique identification code corresponding to the operated bookmarking device 101. In this manner, the user of bookmarking device 101 can be assured a certain level of privacy in operating bookmarking device 101.

Figure 6:
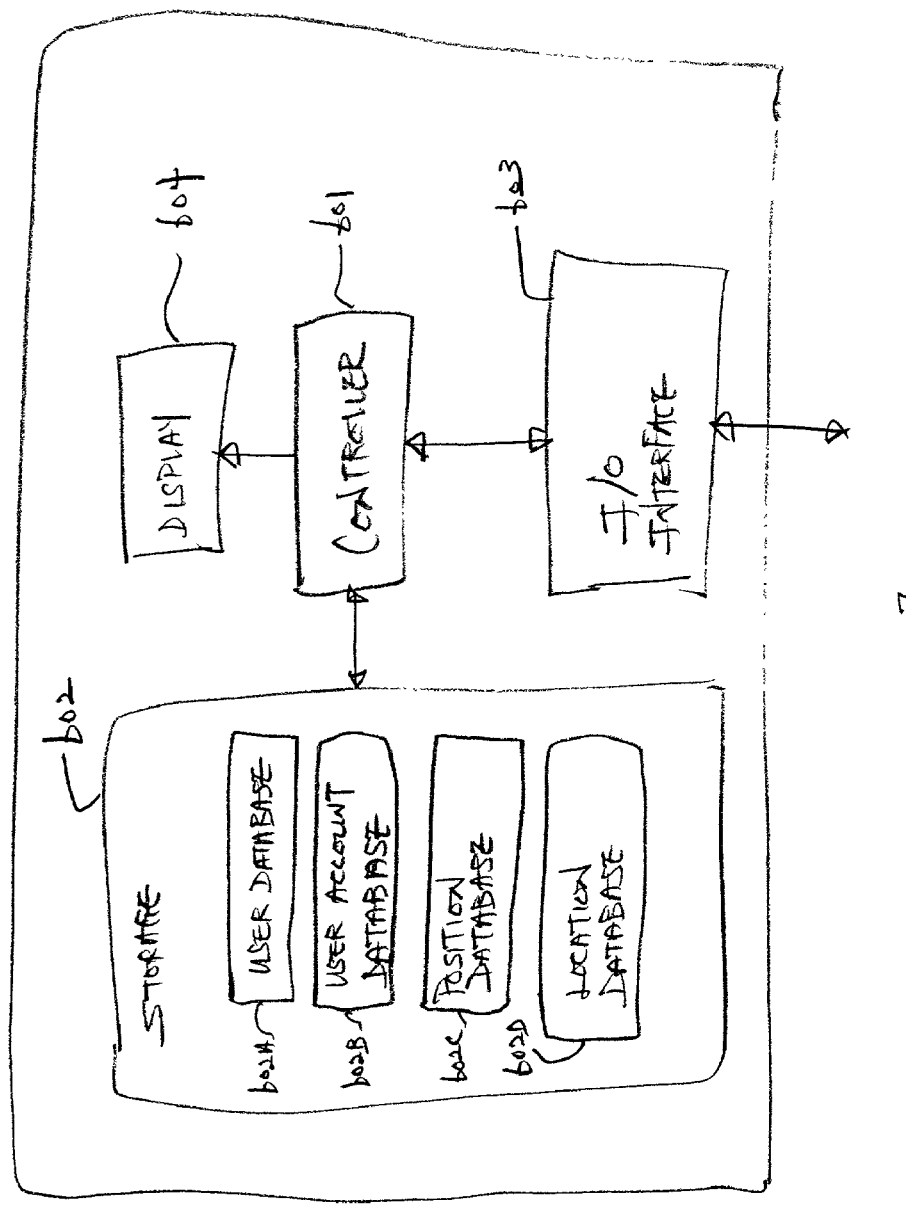
FIG. 6 illustrates a block diagram of the server for the communication system shown in FIG. 1.

FIG. 6 illustrates a block diagram of server 107 of communication system 100 shown in FIG. 1. Referring to FIG. 6, there is provided controller 601 coupled to database storage unit 602 to store, retrieve and update data. In particular, as shown, storage database unit 602 includes user database 602A, user account database 602B, position database 602C, and location database 602D. In one aspect, user database 602A may be configured to store information corresponding to the user of bookmarking device 101 such as one or more of the user's name, contact address, contact information including email address, telephone number, facsimile number, and user account identification number. Similarly, user account database 602B of database storage unit 602 may be configured to store information corresponding to each user's accounts, including but not limited to, the user's account name, the user's account history including the log of the user's bookmarked locations as well as broadcast music clips. Position database 602C and location database 602D of database storage unit 602 may be configured to store position information such as longitudinal and latitudinal information corresponding to the user's bookmarking device 101, and the location identification of the bookmarking enabled locations 102 that have transmitted their location identification to server terminal 107. In addition, within the scope of the present invention, the databases of database storage unit 602 may include other information such as user connection information, satellite network status information, data backup storage information and so on, each of which, may be incorporated in database storage unit 602 as a separate database or integrated with one of the databases 602A–602D shown in FIG. 6.

Referring back to FIG. 6, controller 601 is also coupled to input/output (I/O) interface 603 which is configured to transmit and receive data from interface device 106, bookmarking enabled location 102 or any other compatible communication devices. Optionally, display unit 604 may be provided at server 107 for displaying, for example, data received and/or transmitted from/to interface device 106, bookmarked enabled location 102, the status of data transmission and/or reception to and/or from interface device 106 or the bookmarking enabled location 102. Furthermore, controller 601 may be configured to update information stored in the various databases 602A–602D of the database storage unit 602 such that the information stored in the database storage unit 602 is maintained as up to date as possible.

FIG. 7 illustrates a user database of the database storage unit shown in FIG. 6. Referring to FIG. 7, user database 602A may include a user name field 710, a marker identification (ID) field 720, a user account name field 730, a user billing information field 740, and a user contact information field 750. As can be seen from the figure, user name field 710 may be configured to store the name of the user of bookmarking device 101, while marker ID field 720 may be configured to store the bookmarking device ID corresponding to the respective device user name. For example, marker ID field 720 corresponding to the user John First may be configured to store the value "A 11-K21-K43-F23" which corresponds to the marker device ID of John First. Moreover, marker ID field 720 corresponding to the user Matt Sawyer may be configured to store the value "K01-U23-N45-I67" as the marker ID for Matt Sawyer. In this manner, for each user and their respective electronic bookmarking devices, a unique marker ID may be stored in user database 602A.

Referring back to FIG. 7, user account name field 730 may be configured to store each user's account name, typically provided by the user, or alternatively, automatically assigned by the server terminal 107 (FIG. 1) upon user registration at the e-marker web site. For example, user account name field 730 corresponding to the user John First may include "FirstJ" indicating John First's account name. While the user account names stored in the user account name field 730 are shown as a combination of each user's initials and/or names, in one aspect, the user account name may be a combination of letters and number, a unique series of number, or any other data string which may uniquely identify the respective user.

As can be further seen from FIG. 7, user billing information field 740 may be configured to store billing information such as credit card number, expiration date, and the type of credit card for each user. For example, user billing information field 740 corresponding to the user Helen Owen may be configured to store the value "AM" indicating her American Express card, having a card number "1245-856978-01147". In another aspect, user billing information field 740 may include the user's bank account information such as the user's bank account name, account number, and so on. Moreover, in other embodiments, the user billing information field 740 may include information corresponding to the user's transferable assets that the user wishes use as the preferred payment method for charges incurred, such as, for example, the user's frequent flier miles, the user's bank debit card, and so on. Referring again to FIG. 7, user contact information field 750 may be configured to store contact information corresponding to each user. For example, in one aspect, user contact information field 750 may be configured to store email addresses of each respective user. Alternatively, user contact information field 750 may be configured to store a telephone number, a facsimile number, a pager number or any other type of contact information for the respective users. Moreover, user database 602A may be further configured to store other relevant information corresponding to the users.

FIG. 8 illustrates a user account database of the database storage unit shown in FIG. 6. Referring to FIG. 8, user account database 602B may include marker ID field 810, user account name field 820, user account status field 830, and user payment status field 840 for each registered user account at e-marker.com web site. As can be seen, marker ID field 810 and user account name field 820 substantially correspond to marker ID field 720 and user account name field 730 of user database 602A shown in FIG. 7. In this manner, information stored in user database 602A may be correlated with the information stored in user account database 602A for each respective users. In one aspect, marker ID field 810 may be omitted in user account database 602B since the information stored in user account database 602B may be retrieved for each respective user based on the account name stored in user account name field 820.

Referring back to FIG. 8, user account status field 830 may be configured to store the account status of each user, for example, indicating whether each user account is active ("Active"), inactive ("Inactive"), or closed ("Closed"). In one aspect, a unique data string which may comprise a combination of letters and/or numbers may be used to indicate the status of the user accounts. Furthermore, as can be seen from FIG. 8, user payment status field 840 may be configured to store the payment status of the corresponding user accounts by storing data string such as "Past Due" indicating that the user has not paid the invoice corresponding to the user's account by the due date, "Current" indicating that the user's invoice has been paid by the due date, "Delinquent" indicating that the user has missed a predetermined number of payments and has been declared delinquent, and "Closed" indicating that the user's account has been closed. In this manner, from the information stored in user account database 602B, server terminal 107 may retrieve information related to the respective user's account as well as to update the information stored in user account database 602B.

FIG. 9 illustrates a position database of the database storage unit shown in FIG. 6. Referring to FIG. 9, position database 602C is provided with marker ID field 910, bookmark no. field 920, longitude field 930, latitude field 940, date field 950, and time field 960. As can be seen, marker ID field 910 substantially stores bookmarking device identification code similar to marker ID fields 720 and 810 of user database 602A and user account database 602B, respectively. Moreover, for each electronic bookmarking device with marker ID stored in marker ID field 910, the corresponding bookmarks operated by bookmarking device 101 may be stored in bookmark no. field 920.

Longitude field 930 and latitude field 940 each may be configured to store positional data, such as for example, longitudinal information and latitudinal information respectively, received from satellite network 104, including the physical location of the corresponding bookmarking device 101 at the time device 101 is operated for bookmarking. Additionally, date field 950 and time field 960 may be configured to store the date information and time information respectively, of each corresponding bookmark operation by the respective bookmarking device 101. For example, it can be determined from position database 602C that bookmarking device 101 having marker ID "B32-F32-V67-J88" performed its first bookmarking operation on Feb. 1, 2001 at 2:28 pm at a position defined by 43° longitude and 23° latitude, and its fourth bookmarking operation (#4) on Feb. 3, 2001 at 6:23 pm at a position defined by 12° longitude and 79° latitude.

In the manner described above, in one aspect, server terminal 107 may be configured to store and access position information received from electronic bookmarking devices 101 for each of the corresponding bookmarking operation. Furthermore, while position database 602C includes longitude field 930 and latitude field 940, in an alternate embodiment, other position data may be stored in position database 602C so long as the physical location of each bookmarking operation of bookmarking device 101 is uniquely identified and stored.

FIG. 10 illustrates a location database of the database storage unit shown in FIG. 6. Referring to FIG. 10, location database 602D may include location ID field 1010, position information fields such as longitude field 1020 and latitude field 1030, name field 1040, address field 1050, and contact information field 1060. Location identification data stored in location ID field 1010 in one embodiment may be transmitted from the corresponding bookmarking enabled location 102 (such as a store, a boutique, a merchant location, and a restaurant), to server terminal 107 (FIG. 1). In turn, server terminal 107 may be configured to receive the physical location information such as the longitude and latitude information of the bookmarking enabled location 102 from satellite network 104, and stores the same with the received location ID in location ID field 1010. Alternatively, physical location information may be received from bookmarking enabled location 102 along with the location ID, and accordingly, stored in the respective longitude field 1020 and latitude field 1030 of location database 602D.

Name field 1040, address field 1050 and contact information field 1060 of location database 602D may be configured to respectively store the name, the address information and the contact information such as the name of the manager or owner of the location as well as the respective telephone numbers or email addresses. In this manner, in one aspect, server terminal 107 (FIG. 7) may be configured to identify the location and provide the particulars of the location such as the name, address and contact information of the location, based on the position information stored in longitude and latitude fields 1020, 1030.

For example, it can be seen from position database 602C of FIG. 9 that bookmarking device 101 having marker ID "K01-U23-N45-I67" is operated for its bookmark #2 on Jan. 30, 2001 at 6:53 pm at a position defined by 27° longitude and 34° latitude. Based on this information, server terminal 107 may query location database 602D and determine that the location defined by 27° longitude and 34° latitude corresponds to a store named Garment for U having location ID no. ID201458, and located in 142 Main Road, San Francisco, Calif. 94110, owned by Fab Silk whose telephone number is (415) 245-9947. In other words, the bookmarking device 101 having marker ID "K01-U23-N45-I67" was operated for its second bookmark at Garment for U in San Francisco on Jan. 30, 2001. In this manner, server terminal 107 (FIG. 1) may be configured to readily ascertain the location information corresponding to position data received from the electronic bookmarking device and accordingly, retrieve the matching location information (such as store name, location and so on).

Figure 11:
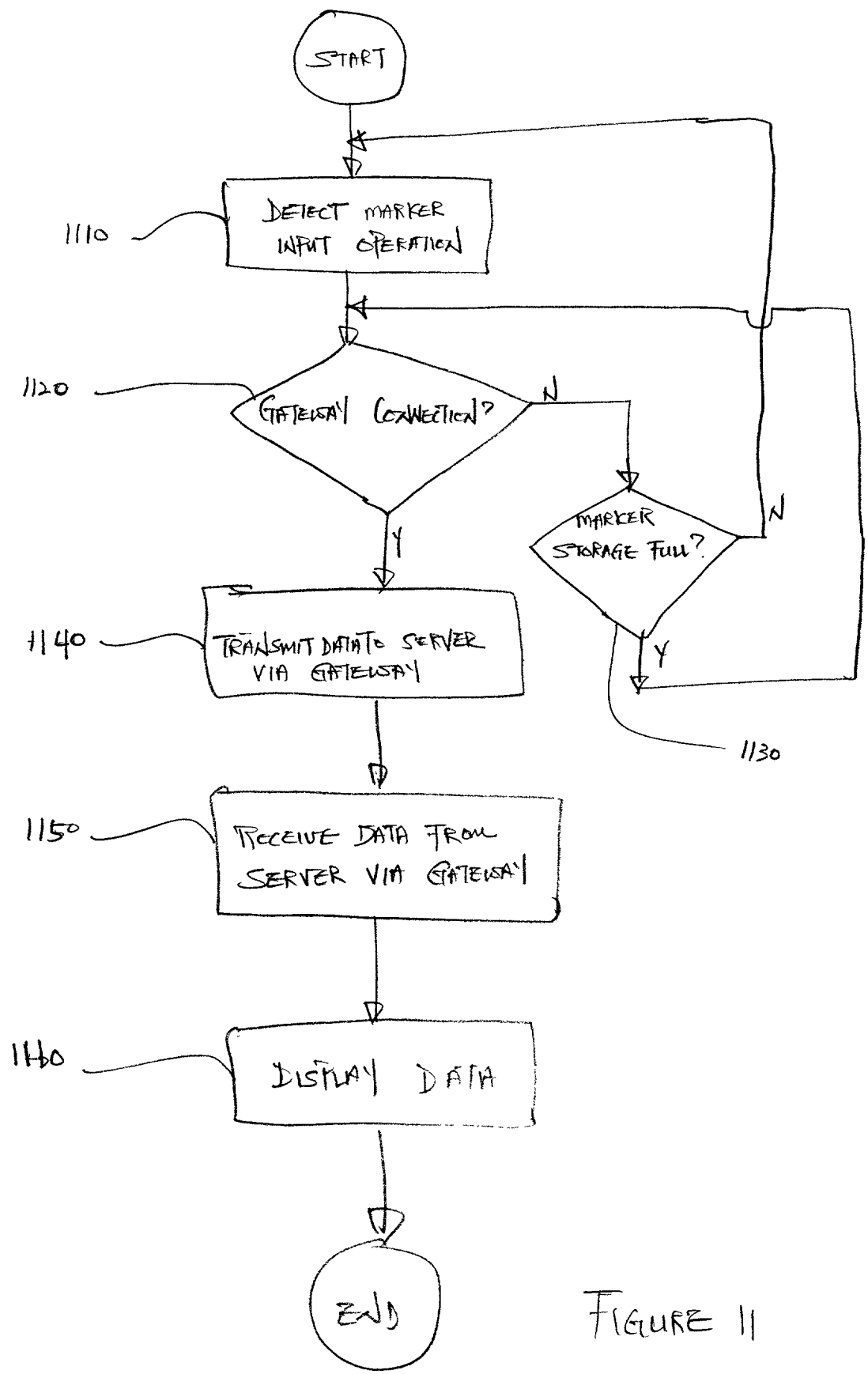
FIG. 11 is a flow chart of the location bookmarking and retrieving location information corresponding to the bookmarked location.

FIG. 11 is a flow chart of the location bookmarking and retrieving location information corresponding to the bookmarked location. Referring to FIGS. 1 and 11, at step 1110, an input operation of bookmarking device 101 is detected, and at step 1120, it is determined whether the bookmarking device 101 has established a connection with interface device 106 via cradle-type connection 105 or alternatively, via a wireless connection such as IrDA ports or Bluetooth enabled communication ports. If it is determined at step 1120 that a connection has not been established between bookmarking device 101 and interface device 106, then at step 1130 it is determined whether the storage unit such as memory 201 of bookmarking device 101 is full. If it is determined that memory 201 of bookmarker device 101 is full at step 1130, then the procedure returns to step 1120 to determine whether a connection between bookmarker device 101 and gateway device 106 has been established. On the other hand, if at step 1130 it is determined that memory 201 of bookmarker device 101 is not full, then the procedure returns to step 1110 to detect additional bookmarking operations by electronic bookmarker device 101.

Referring back to step 1120, if it is determined that a connection has been established between bookmarking device 101 and gateway device 106, then at step 1140, bookmarking device 101 is configured to transfer bookmarked data to server terminal 107 via its connection to gateway device 106. Then, at step 1150, bookmarking device 101 is configured to receive data from server terminal 107, and at step 1160, the received data may be displayed on, for example, display unit 207 of bookmarking device 101. In one embodiment, the data received by bookmarking device 101 from server terminal 107 may be displayed on a display unit of interface device 106 at the same time. Furthermore, interface device 106 may be configured to display data transmitted to server terminal 107 as well as that received therefrom. Moreover, interface device 106 may be further configured to display or output signals indicating the connection status between bookmarking device 101 and server terminal 107, data transmission status, data transmission rate, and data transmission protocol.

In one aspect, the bookmarked data transmitted from bookmarking device 101 to server terminal 107 may include positional information such as longitude and latitude of bookmarking device 101 corresponding to the stored bookmarks, time and date information corresponding to the stored bookmarks, as well as marker ID corresponding to bookmarking device 101. With the positional information, time and date information as well as the bookmarker device ID, server terminal 107 may be configured to retrieve from location database 602D location information such as the name of the location (for example, store or boutique name, restaurant name, or bank name), the address of the location as well as the contact information of the location corresponding to the position information received from bookmarking device 101, for transmission to bookmarking device 101 via interface device 106.

Figure 12:
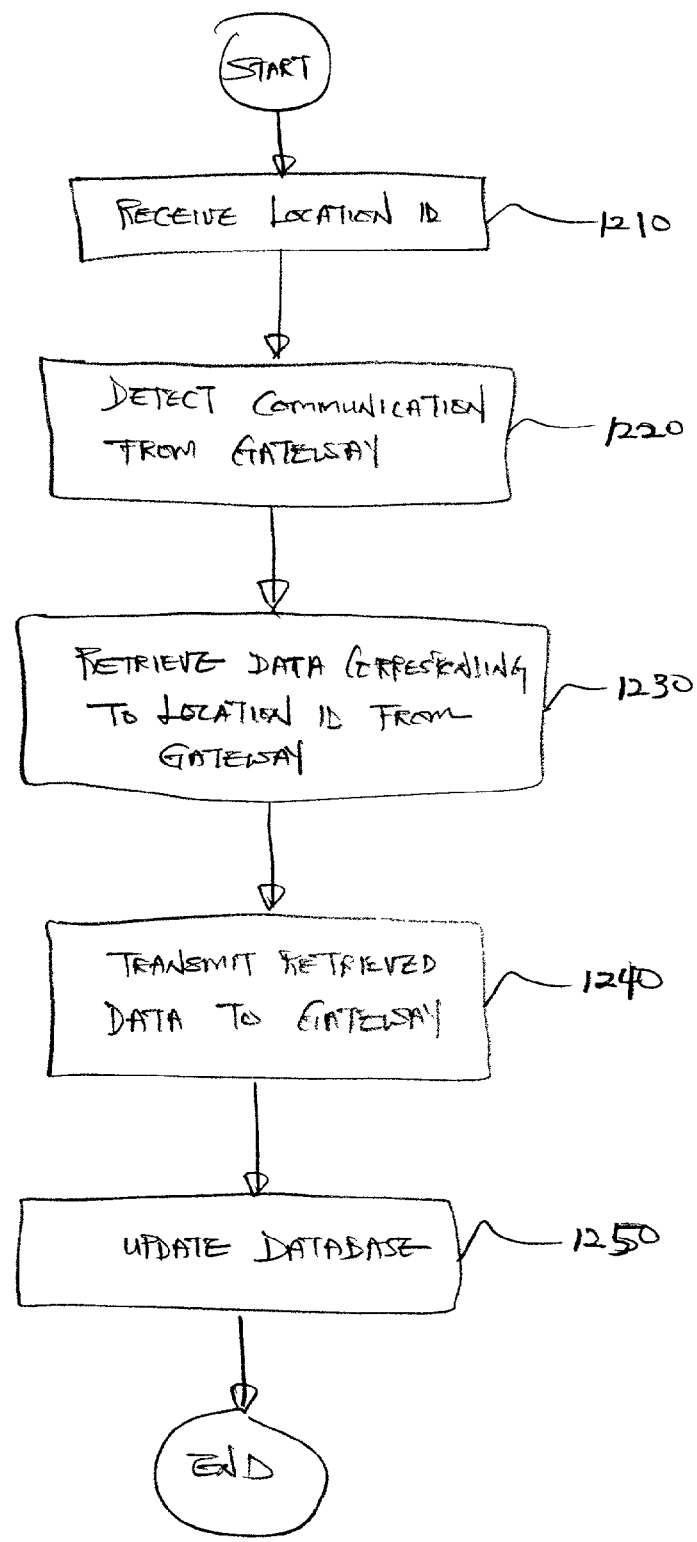
FIG. 12 is a flow chart of the data processing at the server terminal of the communication system shown in FIG. 1.

FIG. 12 is a flow chart of the data processing at the server terminal of the communication system shown in FIG. 1. Referring to FIG. 12, at step 1210, server terminal 107 may be configured to receive location ID from various locations such as stores, boutiques, banks, restaurants, and to store the received location IDs in corresponding location ID fields 1010 in location database 602D. Thereafter at step 1220, server terminal 107 may detect communication from bookmarking device 101 via a gateway connection. At step 1230, server terminal 107 may be configured to receive data including location IDs corresponding to bookmarked location from gateway device 106, and accordingly, may be configured to retrieve location information from location database 602D (FIG. 10) corresponding to location IDs received from gateway device 106. After retrieving the location information corresponding to the received location IDs, server terminal 107 may be configured to transmit the retrieved location information to gateway device 106. Thereafter, at step 1250, server terminal 107 may be configured to access each of user database 602A, user account database 602B, position database 602C, and location database 602D of data storage unit 602 of server terminal 107 and update the stored information in each respective databases 602A–602D accordingly.

Figure 13:
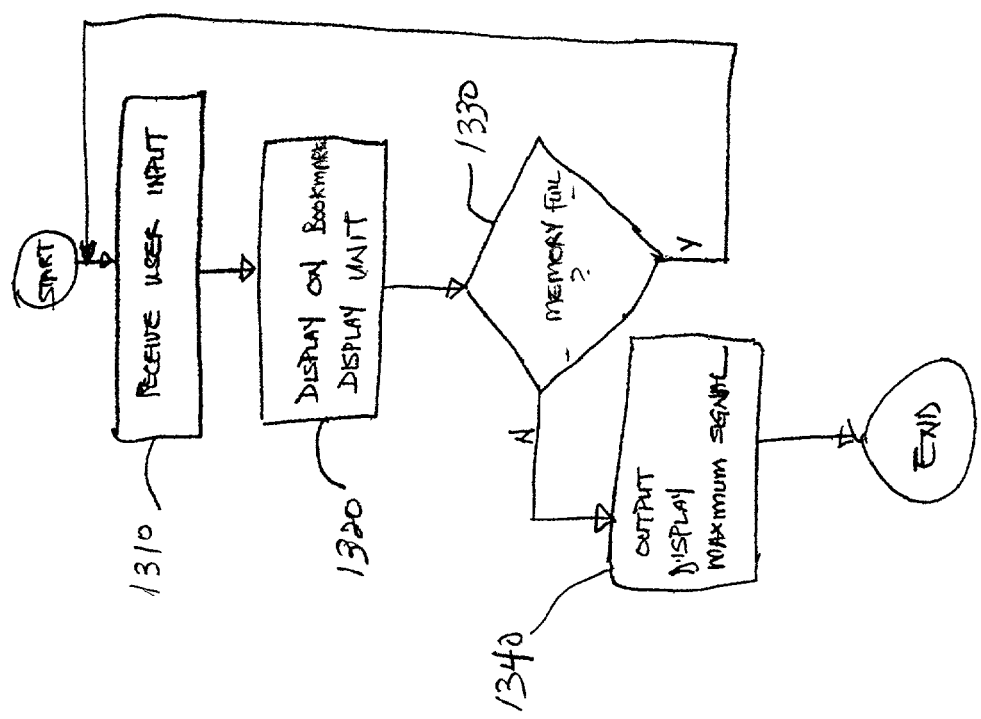
FIG. 13 is a flow chart for illustrating one embodiment of the electronic bookmarking device operation.
Figure 1:
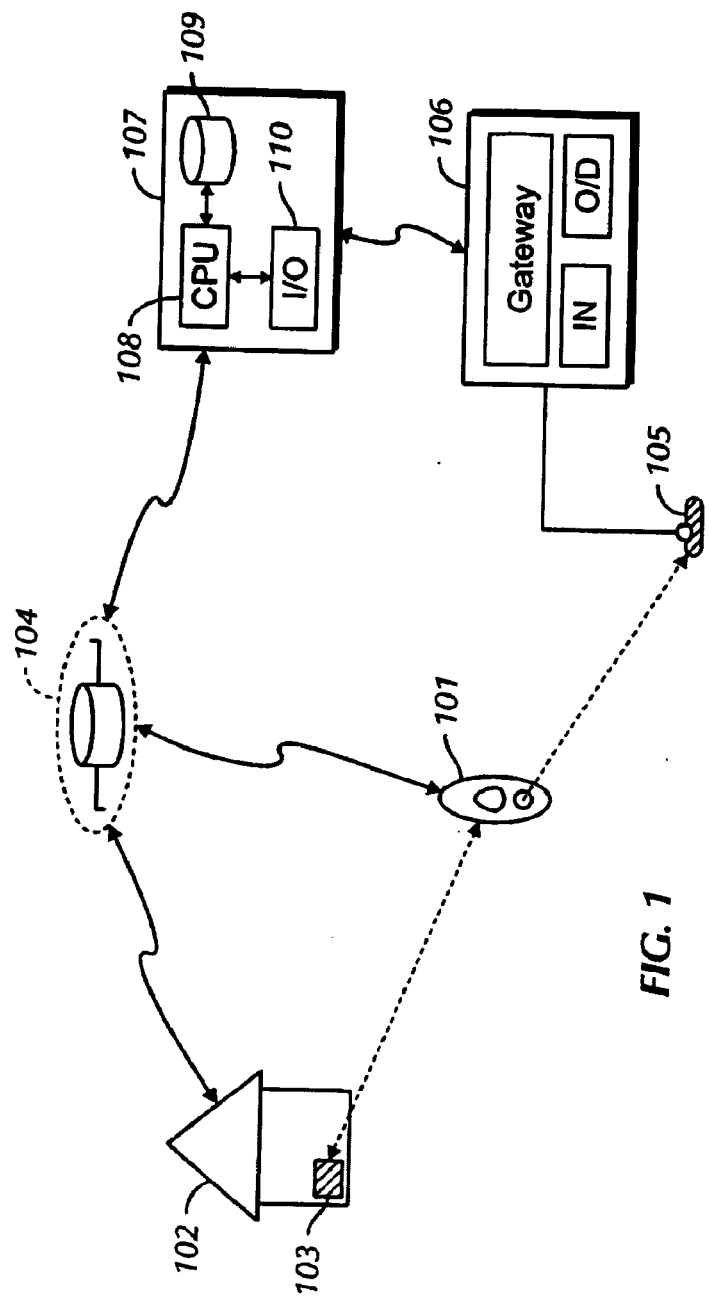
Figure 2:
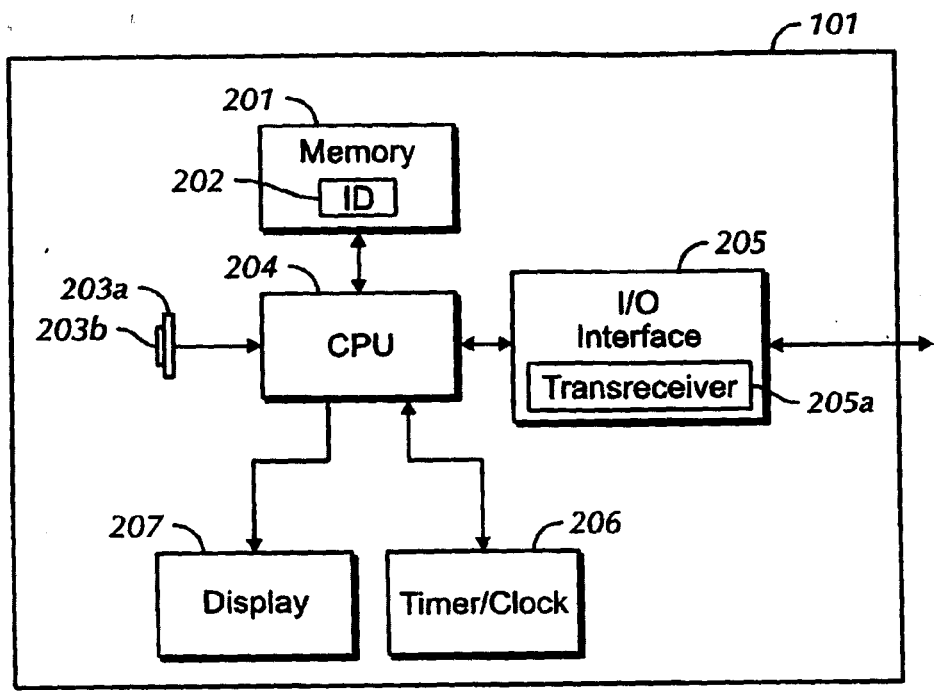
Figure 4:
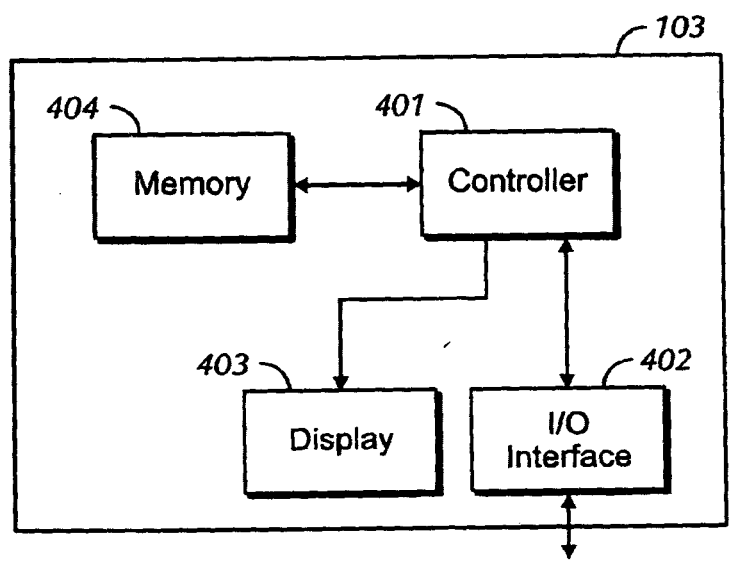
Figure 6:
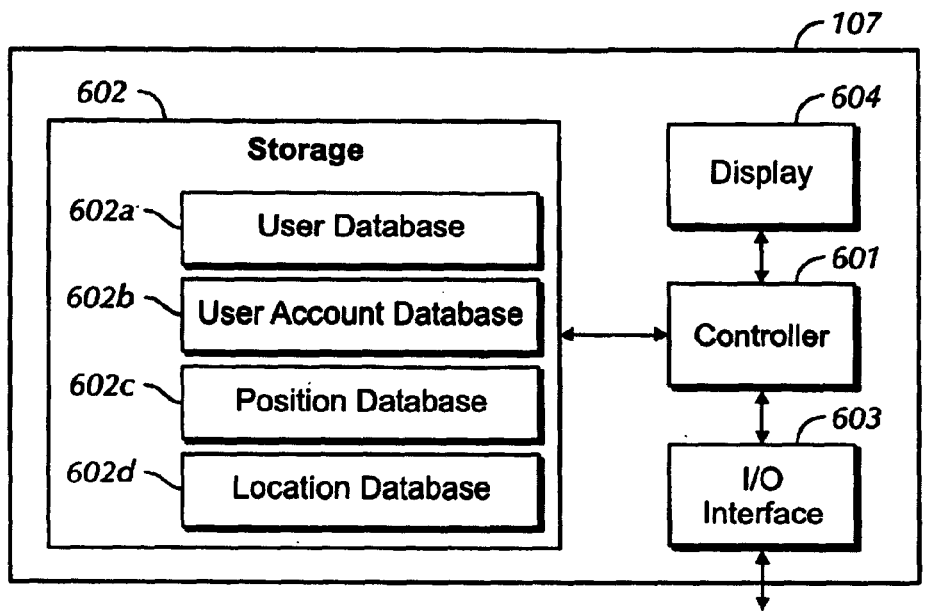
Figure 13:
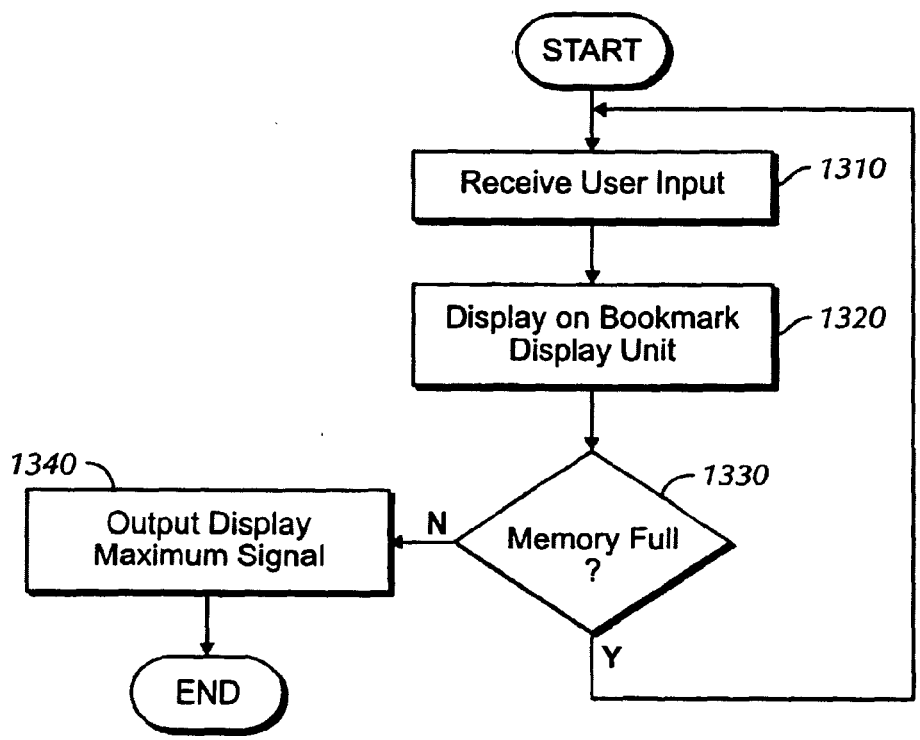
Figure 11:
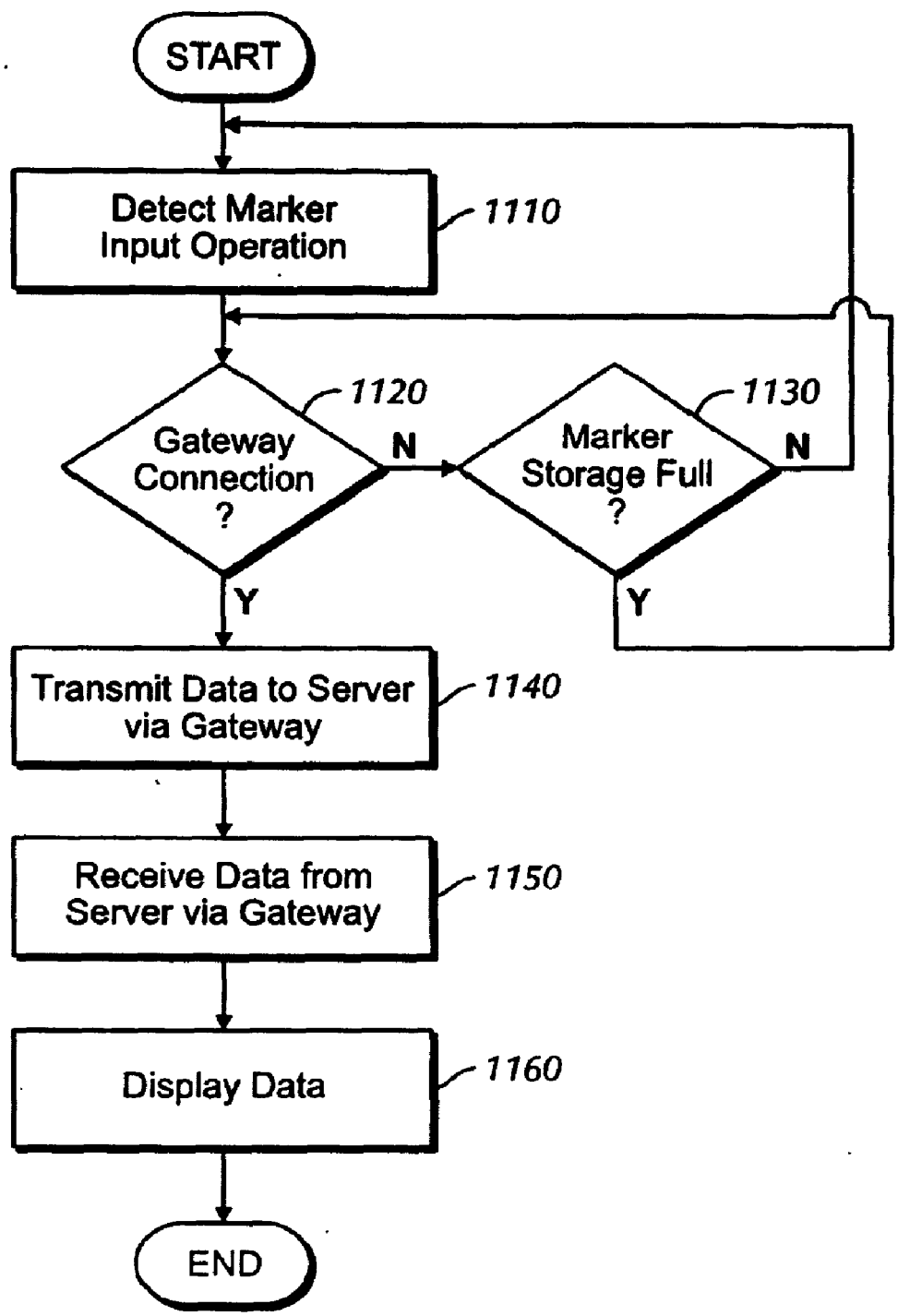
Figure 12:
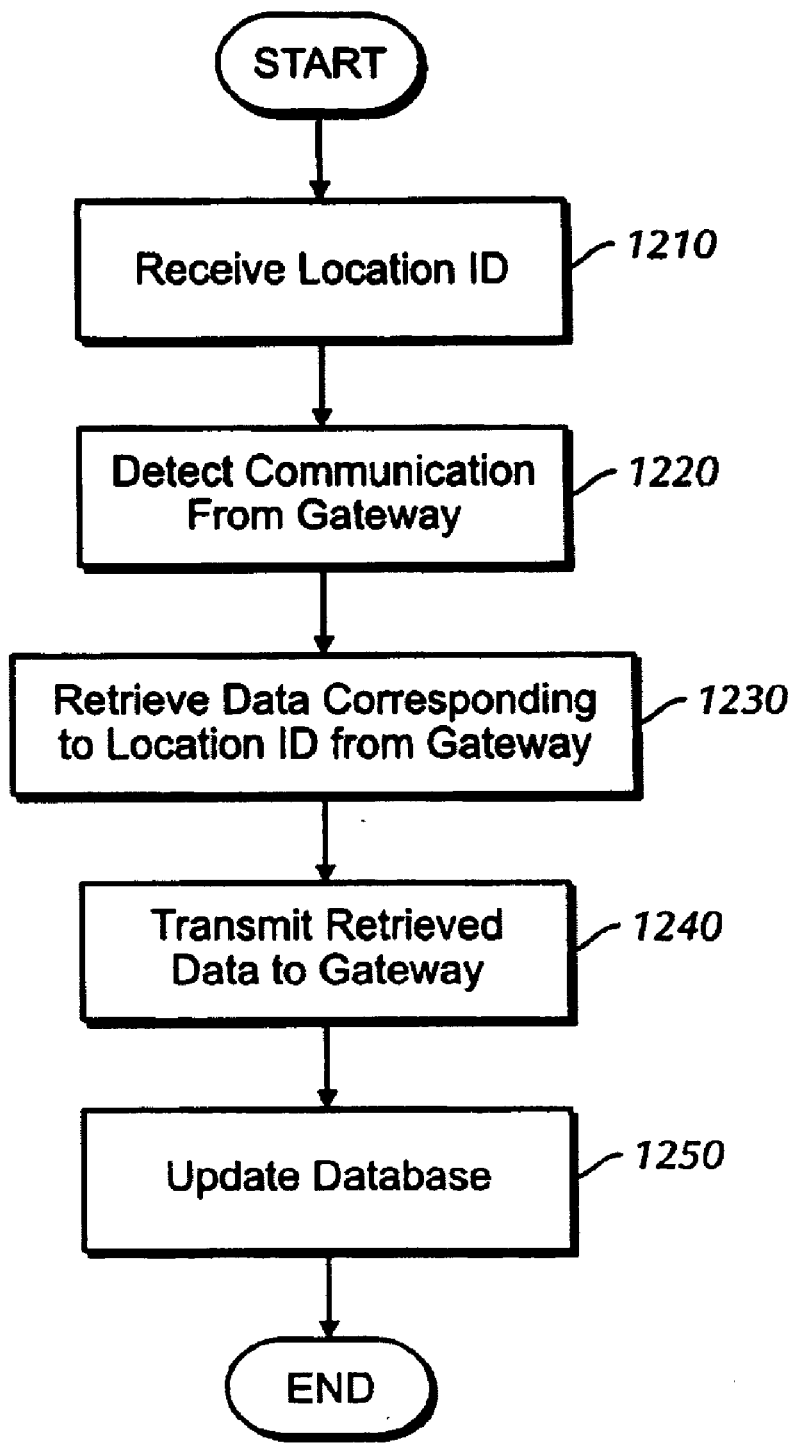
Figure 14:
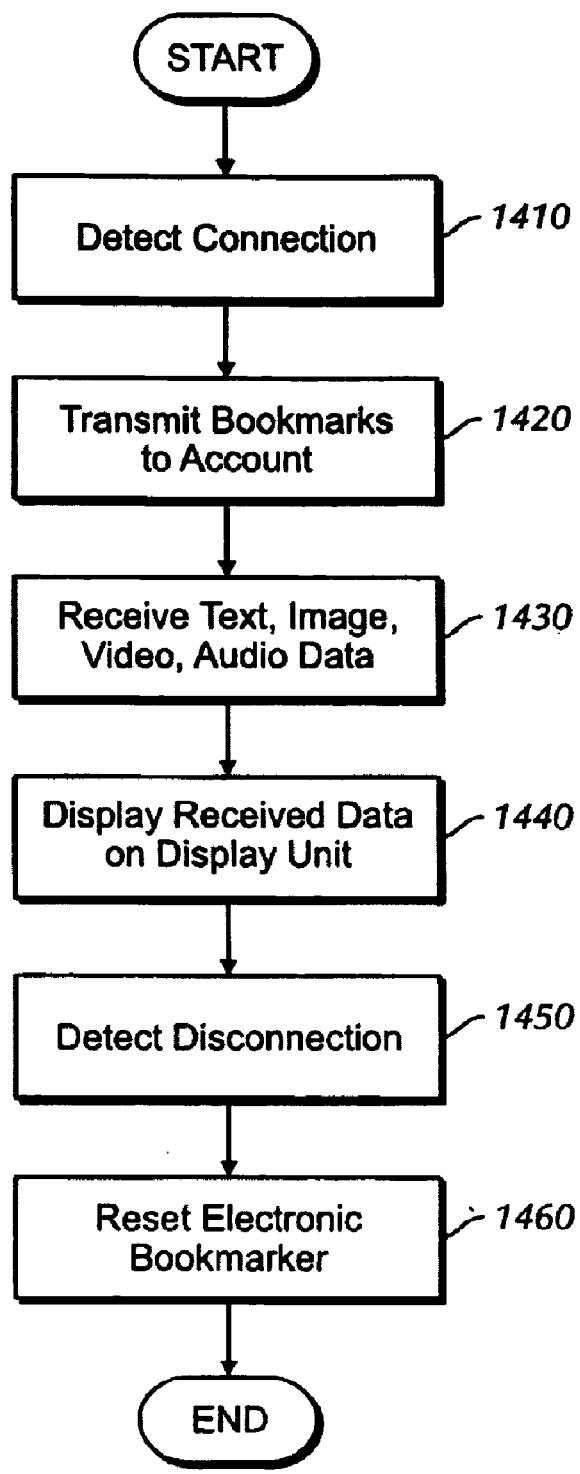

FIG. 13 is a flow chart for illustrating one embodiment of the electronic bookmarking device operation. Referring to FIGS. 2 and 13, at step 1310, bookmarking device 101 detects user's input operation of input unit 203A, 203B. Then, at step 1320, bookmarking device 101 illuminates. flashes or otherwise displays an indication of the inputted bookmarking operation on display unit 207. Display unit 207 in one aspect may include a plurality of segments for individually identifying each entered bookmark. Additionally, display unit 207 may alternatively be configured to separately display a bookmarking operation to bookmark a location or a music clip broadcast over a registered radio or television station As discussed above, in one embodiment, the display unit 207 may also display time and/or date information of the user's input operation of input unit 203A, 203B.

Referring back to FIG. 13, at step 1330, bookmarking device 101 determines whether its memory 201 is full. If it is determined that memory 201 of bookmarking device 101 is not full, then bookmarking device 101 awaits for further input operation by the user at step 1310. On the other hand, if it is determined that memory 201 of bookmarking device 101 is full, then at step 1340, bookmarking device 101 generates an output signal to inform the user that bookmarking device 101 has reached its maximum number of bookmarks that it can handle, and the procedure ends. In one embodiment, the output signal from bookmarking device 101 to inform the user that it has reached its maximum number of bookmarks it can handle may be an audible output signal such as an audible tone via an audio output terminal (not shown). Alternatively, bookmarking device 101 may be configured to flash display unit 207 momentarily for a predetermined period of time to visually indicate to the user that it has reached its maximum number of bookmarks that it can handle.

Figure 14:
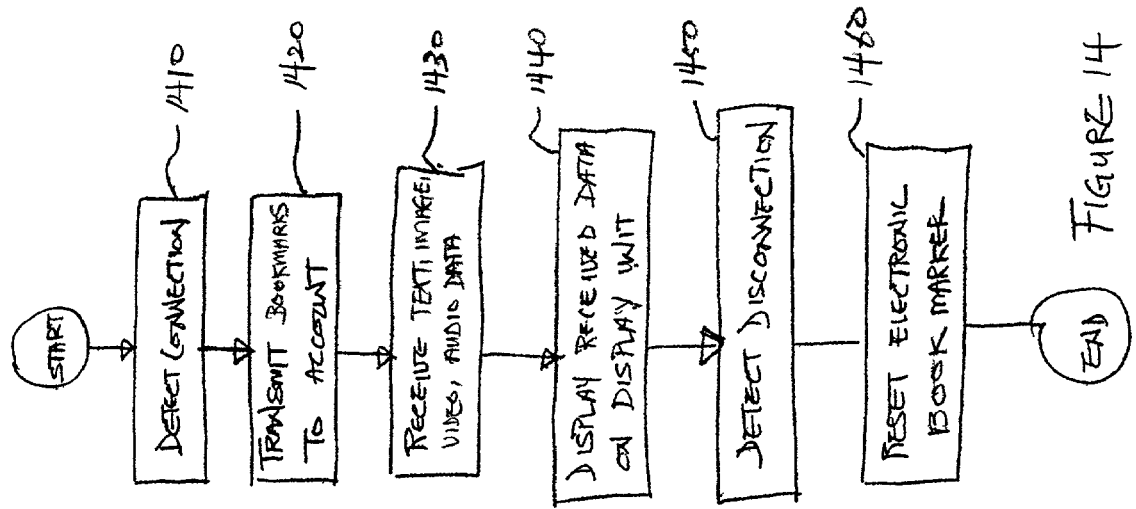
FIG. 14 is a flow chart illustrating one embodiment of downloading data from the user's e-marker account to electronic bookmarking device.

FIG. 14 is a flow chart illustrating one embodiment of downloading data from the user's e-marker account at server terminal 107 to bookmarking device 101. Referring to FIGS. 1, 6 and 14, at step 1410, bookmarking device 101 detects a connection to interface device 106 such as a personal computer connected to the internet. After the user enters the user's account information and performing necessary e-marker account access steps at the gateway device 106 to log onto the user's e-marker account at e-marker.com web site, at step 1420, data corresponding to the bookmarks such as bookmarked location IDs stored in bookmarking device 101 is transmitted to the user's e-marker account via the gateway device 106, and in response, server terminal 107 accesses storage unit 602 (FIG. 6) and retrieves stored data corresponding to the received information, in the form of text, image, video or audio data to transmit to the user's e-marker account. Then, at step 1430, the text, image, video or audio data corresponding to each bookmarks are downloaded onto bookmarking device 101. At step 1440, the downloaded text, image, video, audio data are displayed on display unit 207 on bookmarking device 101.

When the user disconnects bookmarking device 101 from interface device 106, the termination of the connection between bookmarking device 101 and interface device 106 is detected at step 1450. Then, at step 1460, bookmarking device 101 is reset such that previously stored bookmarks inputted by the user is erased from memory 201 of bookmarking device 101, and correspondingly, the display unit 207 is also reset. The user may then operate input unit 203A, 203B again to input additional bookmarks including music clip bookmarks, for music broadcasts from registered radio and television stations, as well as location bookmarks for bookmarking interested locations such as stores, banks, and any other bookmark-enabled locations 102 whose locations, as well as the physical locations of the bookmarking device 101 can be accurately determined by satellite network 104 such as GPS and Globalstar.

In the manner described above, in accordance with the various embodiments of the present invention, bookmarking device 101 may be configured to bookmark a particular location, or alternatively, to bookmark music clip broadcasts from registered radio or television stations. Upon connection to server terminal 107 at a later point in time, the user of bookmarker device 101 may conveniently recall and access information corresponding to the bookmarked locations such as the name of the store, the location of the store, and the contact information of the store from data received from server terminal 107. In addition, the user may also retrieve information corresponding to the bookmarked music clips such as the name of the artist, the name of the music clip, the name of the album for the music clip. Accordingly, users of bookmarking device 101 do not have to constantly write down information corresponding to the stores or locations visited or music clips broadcast for later use. A simple operation of bookmarking device 101 conveniently bookmarks the location or the broadcast music clip such that the user can retrieve the information related to the bookmarked location or the information relevant to the bookmarked music clip from server terminal 107.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A satellite network enabled position marking system, comprising:
    a location configured to communicate with a satellite network;
    a data marking device configured to communicate with said satellite network to receive a position data and to receive a location identification code from said location; and
    a server terminal configured to communicate with said satellite network and said data marking device, said server terminal further configured to transmit location information to said data marking device in response to receiving said position data and said identification code from said data marking device.

2. The system of claim 1 wherein said satellite network includes a Global Positioning System.

3. The system of claim 1 wherein said location includes an interface unit configured to communicate with said satellite network and said data marking device.

4. The system of claim 1 wherein said data marking device includes an input unit, said data marking device configured to receive said location identification code in response to an operation of said input unit.

5. The system of claim 4 wherein said data marking device includes a display unit for displaying a position mark corresponding to said received location identification code.

6. The system of claim 1 wherein said data marking device includes a storage unit for storing said position data and said location identification code.

7. The system of claim 1 wherein said data marking device includes a device identification code stored in a memory.

8. The system of claim 6 wherein said data marking device is configured to transmit said device identification code to said server terminal.

9. The system of claim 1 wherein said server terminal includes a storage unit for storing said received position data, said location identification code and said location information.

* * * * *

UNITED STATES PATENT AND TRADEMARK OFFICE
CERTIFICATE OF CORRECTION

PATENT NO. : 6,972,698 B2
APPLICATION NO. : 10/184573
DATED : December 6, 2005
INVENTOR(S) : Deguchi It is certified that error appears in the above-identified patent and that said Letters Patent is hereby corrected as shown below:

The title page showing the print figure should be deleted, and replaced with the attached amended title page.
Drawing sheets, consisting of Fig. 1, 2, 3, 4, 5, 6, 7, 8, 9, 10, 11, 12, 13, and 14 should be deleted and replaced with the drawings sheets, consisting of Fig. 1, 2, 3, 4, 5, 6, 7, 8, 9, 10, 11, 12, 13, and 14 as shown on the attached pages.

Signed and Sealed this

Nineteenth Day of September, 2006

JON W. DUDAS
*Director of the United States Patent and Trademark Office*

(12) United States Patent  (10) Patent No.: US 6,972,698 B2
Deguchi  (45) Date of Patent: Dec. 6, 2005

(54) GPS E-MARKER

(75) Inventor: Yuichiro Deguchi, San Mateo, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 250 days.

(21) Appl. No.: 10/184,573

(22) Filed: Jun. 28, 2002

(65) Prior Publication Data

US 2004/0000995 A1  Jan. 1, 2004

(51) Int. Cl.$^7$ ............................................. G08G 1/123
(52) U.S. Cl. ............. 340/988; 340/539.1; 340/825.49
(58) Field of Search ........................... 340/988, 990, 340/995.1, 426.19, 524, 539.1, 539.13, 825.49; 455/73, 403

(56) References Cited

U.S. PATENT DOCUMENTS

| | | | |
|---|---|---|---|
| 3,836,842 A * | 9/1974 | Zimmermann et al. ..... 324/239 |
| 5,199,009 A | 3/1993 | Svast ........................ 368/240 |
| 5,297,118 A | 3/1994 | Sakumoto ................... 368/10 |
| 5,508,978 A | 4/1996 | Kalbermatter et al. ....... 368/13 |
| 5,579,472 A | 11/1996 | Keyworth, II et al. ...... 395/326 |
| 5,758,257 A | 5/1998 | Herz et al. .................. 455/2 |
| 5,850,218 A | 12/1998 | LaJoie et al. ............... 345/327 |
| 5,889,737 A | 3/1999 | Alameh et al. ............. 368/204 |
| 5,915,288 A | 6/1999 | Gabriel ........................ 84/609 |
| 6,088,021 A | 7/2000 | Yong ........................ 345/163 |
| 6,100,884 A | 8/2000 | Tomita et al. .............. 345/327 |
| 6,104,334 A | 8/2000 | Allport ....................... 341/175 |
| 6,128,009 A | 10/2000 | Ohkura et al. ............. 345/327 |
| 6,144,864 A | 11/2000 | Lands et al. ................ 455/569 |
| 6,148,261 A * | 11/2000 | Obradovich et al. ......... 701/208 |
| 6,158,884 A | 12/2000 | Lebby et al. ............... 368/282 |
| 6,169,498 B1 | 1/2001 | King et al. ................. 340/999 |
| 6,199,125 B1 | 3/2001 | Cortesi ....................... 710/67 |
| 6,216,230 B1 | 4/2001 | Rallis et al. ................ 713/185 |
| 6,230,172 B1 | 5/2001 | Purnaveja et al. .......... 707/512 |
| 6,263,438 B1 | 7/2001 | Walker et al. .............. 713/178 |
| 6,272,545 B1 | 8/2001 | Flanagin et al. ............ 709/228 |
| 6,289,346 B1 | 9/2001 | Milewski et al. ............. 707/10 |
| 6,290,517 B1 | 9/2001 | Anderson ................... 439/131 |
| 6,304,249 B1 | 10/2001 | Derocher et al. ........... 345/163 |
| 6,323,783 B1 | 11/2001 | Lizzi et al. ............. 340/825.44 |
| 6,330,490 B1 | 12/2001 | Kim et al. .................. 700/234 |
| 6,353,398 B1 * | 3/2002 | Amin et al. ............ 340/995.12 |
| 6,356,971 B1 | 3/2002 | Katz et al. .................. 710/301 |
| 6,360,209 B1 | 3/2002 | Loeb et al. .................. 705/34 |
| 6,392,635 B1 | 5/2002 | Snyder ....................... 345/163 |
| 6,425,081 B1 | 7/2002 | Iwamura .................... 713/176 |
| 6,427,175 B1 | 7/2002 | Khan et al. ................. 709/245 |
| 6,493,702 B1 | 12/2002 | Adar et al. ..................... 707/3 |
| 6,507,727 B1 | 1/2003 | Henrick ..................... 455/3.06 |
| 6,515,595 B1 * | 2/2003 | Obradovich et al. ........ 340/905 |
| 6,556,513 B2 | 4/2003 | Wimberly ..................... 368/82 |
| 6,559,773 B1 | 5/2003 | Berry ...................... 340/815.4 |
| 6,571,577 B2 | 6/2003 | Radley-Smith ................. 63/3 |
| 6,578,047 B1 | 6/2003 | Deguchi ..................... 707/104 |
| 6,637,028 B1 | 10/2003 | Voyticky et al. .............. 725/42 |
| 6,650,534 B2 | 11/2003 | Tree ........................... 361/686 |
| 6,650,877 B1 | 11/2003 | Tarbouriech et al. ..... 455/186.1 |
| 6,674,993 B1 | 1/2004 | Tarbouriech ............... 455/2.01 |
| 6,680,714 B2 | 1/2004 | Wilmore ..................... 345/1.1 |
| 6,763,371 B1 | 7/2004 | Jandel ....................... 709/204 |

(Continued)

Primary Examiner—Phung T. Nguyen
(74) Attorney, Agent, or Firm—John P. O'Banion

(57) ABSTRACT

Method and system for a satellite network data communication enabled electronic bookmarking device for bookmarking positional information of a desired location or locations in addition to bookmarking broadcast music clips over registered radio or television stations is provided.

9 Claims, 13 Drawing Sheets

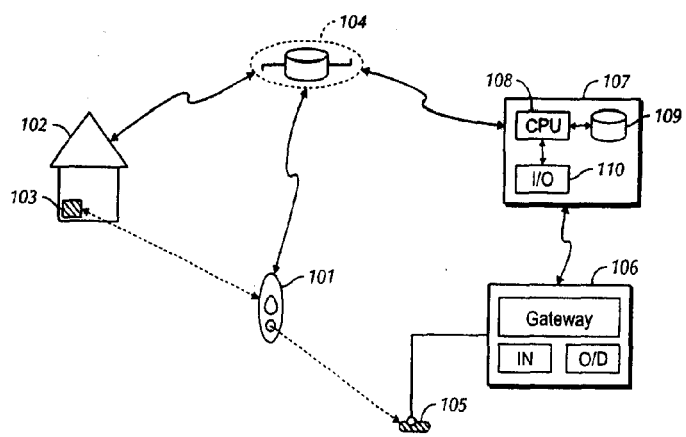

| Device ID: K01-U03-N45-I67 | | | |
|---|---|---|---|
| Bookmark | Date | Time(GMT) | Location ID |
| Bookmark #1 | 1/21/01 | 13:46 | ID123100 |
| Bookmark #2 | 1/30/01 | 18:53 | ID201458 |
| Bookmark #3 | 2/1/01 | 9:13 | ID201458 |
| Bookmark #4 | 2/1/01 | 11:32 | ID279465 |
| Bookmark #5 | 2/1/01 | 16:12 | ID012458 |
| Bookmark #6 | 2/2/01 | 1:23 | ID879454 |

*FIG. 3*

| Location ID: ID201458 | | |
|---|---|---|
| Date | Time (GMT) | Marker ID |
| 1/19/01 | 13:46 | A11-K21-K43-F23 |
| 1/30/01 | 18:53 | K01-U23-N45-I67 |
| 2/1/01 | 9:13 | ID Blocked |
| 2/2/01 | 11:32 | B32-F32-V67-J88 |
| 2/2/01 | 12:32 | B33-D23-D45-K12 |
| 2/3/01 | 1:23 | B32-F32-V67-J88 |

*FIG. 5*

FIG. 7

| User Name | Marker ID | User Account Name | User Billing Information | User Contact Information |
|---|---|---|---|---|
| John First | A11-K21-K43-F23 | FirstJ | VS: 5485-5647-8821-0012 | firstJ@yahoo.com |
| Matt Sawyer | K01-U23-N45-I67 | Msawyer | DIS: 456-85468-45441 | mattsaw@netzero.com |
| Steve Sansnishi | B32-F32-V67-J88 | Tznet | MS: 3215-5649-1300-8745 | tz@greatnet.net |
| Helen Owen | B33-D23-D45-K12 | Howen | AM: 1245-856978-01147 | hoh@aol.com |
| Jack Green | B32-F32-V67-J88 | JGG | VS: 1245-5412-8547-5565 | green@home.net |

FIG. 8

| Marker ID | User Account Name | User Account Status | User Payment Status |
|---|---|---|---|
| A11-K21-K43-F23 | FirstJ | Active | Past Due |
| K01-U23-N45-I67 | Msawyer | Active | Current |
| B32-F32-V67-J88 | Tznet | Inactive | Current |
| B33-D23-D45-K12 | Howen | Active | Delinquent |
| B32-F32-V67-J88 | JGG | Closed | Closed |

| Marker ID | Bookmark # | Longitude | Latitude | Date | Time (GMT) |
|---|---|---|---|---|---|
| A11-K21-K43-F23 | Bookmark 1 | 27 | 34 | 1/19/01 | 13:46 |
| K01-U23-N45-I67 | Bookmark 2 | 27 | 34 | 1/30/01 | 18:53 |
| B32-F32-V67-J88 | Bookmark 1 | 43 | 23 | 2/1/01 | 14:28 |
| B33-D23-D45-K12 | Bookmark 2 | 46 | 61 | 2/2/01 | 11:13 |
| B32-F32-V67-J88 | Bookmark 4 | 12 | 79 | 2/3/01 | 18:23 |

*FIG. 9*

| Location ID | Longitude | Latitude | Name | Address | Contact Information |
|---|---|---|---|---|---|
| ID123100 | 43 | 23 | General Store | 23 High Street<br>Boston, MA 02146 | John Shoes, Manager<br>(617) 124-8859 |
| ID201458 | 27 | 34 | Garmet for U | 142 Main Road<br>San Francisco, CA 94110 | Fab Silk, Owner<br>(415) 245-9947 |
| ID804578 | 78 | 61 | Gadgets, Inc. | One Willow St.<br>Vancouver, B.C. V6B 2M9 | Elan Hayes, Manager<br>(604) 124-7457 |
| ID708845 | 12 | 91 | Creative Drinks | 5 Highway 50<br>Stateline, NV 89449 | Snow Trails, Owner<br>(775) 457-1211 |
| ID065987 | 46 | 61 | Secure Bank | 120 Tree Rd<br>Oakland, CA 94607 | Din Ero, Manager<br>(510) 551-4578 |
| ID708457 | 12 | 79 | Ads, Inc. | 450 Wacker St.<br>Chicago, IL 60651 | Audrey Sees, Manager<br>(312) 322-3124 |

*FIG. 10*